United States Patent
Yin et al.

(10) Patent No.: US 8,988,682 B2
(45) Date of Patent: Mar. 24, 2015

(54) HIGH ACCURACY IMAGING COLORIMETER BY SPECIAL DESIGNED PATTERN CLOSED-LOOP CALIBRATION ASSISTED BY SPECTROGRAPH

(71) Applicant: Apple Inc., Cupertino, CA (US)

(72) Inventors: Ye Yin, Sunnyvale, CA (US); Gabriel G. Marcu, San Jose, CA (US); Jiaying Wu, San Jose, CA (US)

(*) Notice: Subject to any disclaimer, the term of this patent is extended or adjusted under 35 U.S.C. 154(b) by 0 days.

(21) Appl. No.: 14/058,055

(22) Filed: Oct. 18, 2013

(65) Prior Publication Data

US 2014/0111807 A1 Apr. 24, 2014

Related U.S. Application Data

(60) Provisional application No. 61/717,523, filed on Oct. 23, 2012.

(51) Int. Cl.
*G01J 3/46* (2006.01)
*G01J 3/28* (2006.01)

(52) U.S. Cl.
CPC .............................. *G01J 3/28* (2013.01)
USPC ............................................. 356/402

(58) Field of Classification Search
USPC ................... 356/300–334, 402–425
See application file for complete search history.

(56) References Cited

U.S. PATENT DOCUMENTS

| | | | |
|---|---|---|---|
| 4,758,085 A | 7/1988 | Lequime et al. | |
| 5,303,165 A * | 4/1994 | Ganz et al. | 356/319 |
| 5,706,083 A | 1/1998 | Iida et al. | |
| 5,751,420 A | 5/1998 | Iida et al. | |
| 5,892,585 A | 4/1999 | Lianza et al. | |
| 5,963,334 A | 10/1999 | Yamaguchi et al. | |
| 6,058,357 A | 5/2000 | Granger | |

(Continued)

FOREIGN PATENT DOCUMENTS

JP   2003-315153    11/2003
TW      424398      3/2001

OTHER PUBLICATIONS

International Search Report, PCT/US2013/065713, dated Feb. 13, 2014.

(Continued)

*Primary Examiner* — Abdullahi Nur
(74) *Attorney, Agent, or Firm* — Womble Carlyle Sandridge & Rice, LLP (57) ABSTRACT

This specification describes various embodiments that relate to methods for providing a wideband colorimeter that can include more accurate outputs. In one embodiment, a narrowband instrument, such as a spectrometer or spectrograph, can be used for calibration of a wideband colorimeter, so that more accurate outputs can be provided. In one embodiment, an optical test equipment, which consists of both a wideband colorimeter and a narrowband spectrograph, can be used for providing a more accurately calibrated wideband colorimeter. As an example, a spectra-camera, which is a hybrid system consisting of both a wideband colorimeter and a narrowband spectrograph, can be used for simultaneous testing by both the wideband colorimeter and the narrowband spectrograph. By doing simultaneous testing, accurate calibration of the wideband colorimeter can be achieved. This specification further describes a mathematical model to characterize a wideband three channel colorimeter with a narrowband multiple channel spectrometer.

20 Claims, 11 Drawing Sheets

(56) References Cited

U.S. PATENT DOCUMENTS

| | | |
|---|---|---|
| 6,539,323 B2 | 3/2003 | Olson |
| 6,707,553 B1 | 3/2004 | Imura |
| 7,897,912 B2 * | 3/2011 | Dominic et al. .............. 250/239 |
| 7,911,485 B2 | 3/2011 | Rykowski et al. |
| 2008/0100639 A1 | 5/2008 | Pettitt et al. |
| 2009/0201498 A1 * | 8/2009 | Raskar et al. ................. 356/310 |

OTHER PUBLICATIONS

Written Opinion, PCT/US2013/065713, dated Feb. 13, 2014.
Taiwanese Patent Application No. 102137795—Office Action dated Nov. 20, 2014.

* cited by examiner

HIGH ACCURACY IMAGING COLORIMETER BY SPECIAL DESIGNED PATTERN CLOSED-LOOP CALIBRATION ASSISTED BY SPECTROGRAPH

CROSS-REFERENCE TO RELATED APPLICATION

This application claims priority to U.S. Provisional Application Ser. No. 61/717,523 filed Oct. 23, 2012, which is incorporated herein in its entirety by reference.

FIELD OF THE DESCRIBED EMBODIMENTS

The described embodiments relate generally to colorimetry and more particularly to calibrating a low cost colorimeter.

BACKGROUND

Color measurement instruments fall into two general categories: wideband (or broadband) and narrowband. A wideband measurement instrument reports up to 3 color signals obtained by optically processing the input light through wideband filters. Photometers are the simplest example, providing a measurement only of the luminance of a stimulus. Their primary use is in determining the nonlinear calibration function of displays. Densitometers are an example of wideband instruments that measure optical density of light filtered through red, green and blue filters. Colorimeters are another example of wideband instruments that directly report tristimulus (XYZ) values, and their derivatives such as CIELAB. A colorimeter, sometimes also called an imaging photometer, is an imaging device which behaves like a camera. The imaging colorimeter can be a time-sequential type or Bayer-filter type. Under the narrowband category fall instruments that report spectral data of dimensionality significantly larger than three.

Spectrophotometers and spectroradiometers are examples of narrowband instruments. These instruments typically record spectral reflectance and radiance respectively within the visible spectrum in increments ranging from 1 to 10 nm, resulting in 30-200 channels. They also have the ability to internally calculate and report tristimulus coordinates from the narrowband 15 spectral data. Spectroradiometers can measure both emissive and reflective stimuli, while spectrophotometers can measure only reflective stimuli. A spectrometer or spectrograph is a narrowband device which can quantify and measure the spectrum.

The main advantage of wideband instruments such as densitometers and colorimeters is that they are inexpensive and can read out data at very fast rates. However, the resulting measurement is only an approximation of the true tristimulus signal, and the quality of this approximation varies widely depending on the nature of the stimulus being measured. Accurate colorimetric measurement of arbitrary stimuli under arbitrary illumination and viewing conditions requires spectral measurements afforded by the more expensive narrowband instruments. Compared with measuring instruments without spatial resolutions, such as spectrometers, this technology offers the following advantages: (a) Substantial time-savings with simultaneous capture of a large number of measurements in a single image and (b) Image-processing functions integrated in the software permit automated methods of analysis, e.g. calculation of homogeneity or contrast.

However, the absolute measuring precision of imaging photometers and colorimeters is not as high as spectrometers. This is because of the operational principle using a CCD Sensor in combination with optical filters, which can only be adapted to the sensitivity of the human eye with limited precision. Therefore, the imaging colorimeters are the instruments of choice for measurement of luminance and color distribution of panel graphics and control elements in the display test industry, including but not limited to homogeneity, contrast, mura and modulation transfer function (MTF).

Therefore, what is desired is an alternative to wideband colorimeters that can include more accurate outputs.

SUMMARY OF THE DESCRIBED EMBODIMENTS

This specification describes various embodiments that relate to methods for providing a wideband colorimeter that can include more accurate outputs. In one embodiment, a narrowband instrument, such as a spectrometer or spectrograph, can be used for calibration of a wideband colorimeter, so that more accurate outputs can be provided. In one embodiment, an optical test equipment, which consists of both a wideband colorimeter and a narrowband spectrograph, can be used for providing a more accurately calibrated wideband colorimeter. As an example, a spectra-camera, which is a hybrid system consisting of both a wideband colorimeter and a narrowband spectrograph, can be used for simultaneous testing by both the wideband colorimeter and the narrowband spectrograph. By doing simultaneous testing, accurate calibration of the wideband colorimeter can be achieved. This specification further describes a mathematical model to characterize a wideband three channel colorimeter with a narrowband multiple channel spectrometer.

In one embodiment, a method for correcting an output of a wideband color measurement device through use of a narrowband color measurement device is disclosed. The method includes configuring the wideband color measurement device and the narrowband color measurement device to measure color, stimulating the wideband color measurement device and the narrowband color measurement device with predetermined test patterns, capturing color measurement data from the wideband color measurement device and the narrowband color measurement device, determining a correction matrix relating the captured color measurement data, and correcting the color measurement output of the wideband color measurement device with the correction matrix. In one embodiment, the predetermined test patterns include 61 unique digital color stimulus patterns. In one embodiment, the wideband color measurement device is a colorimeter. In one embodiment, the narrowband color measurement device is a spectrometer.

In one embodiment, a method for using a narrowband color measurement device to calibrate a wideband color measurement device is disclosed. The method includes presenting predetermined test patterns, configuring the narrowband device and the wideband device to concurrently measure color data from the predetermined test patterns, capturing the color data from the wideband device and the narrowband device, determining a best fit correction matrix relating the captured color data, evaluating if the best fit correction matrix is acceptable as a calibration parameter for color measurements from the wideband device, and returning to the step of presenting predetermined test patterns when the best fit correction matrix is not acceptable as the calibration parameter. In one embodiment, the method further includes using the best fit correction matrix as the calibration parameter for the color measurements from the wideband device when the best fit correction matrix is acceptable as the calibration parameter. In one embodiment, the best fit correction matrix is a 3×3 matrix. In one embodiment, the best fit correction matrix is a 3×4 matrix. In one embodiment, the predetermined test patterns include 61 unique digital color stimulus patterns. In one embodiment, the wideband device is a colorimeter. In one embodiment, the narrowband device is a spectrometer.

In one embodiment, a system configured to using a narrowband color measurement device to calibrate an output of a wideband color measurement device is disclosed. The system includes a splitter configured to split an image of a test pattern into a first image and a second image, a first image pipeline configured to direct the first image to a narrowband device, a narrowband device configured to capture a first data from the first image, a second image pipeline configured to direct the second image to the wideband device, and a wideband device configured to capture a second data from the second image. The captured first data and the captured second data are used to determine a correction matrix relating the captured first and second data. In one embodiment, the correction matrix is used for calibration of the wideband device. In one embodiment, the wideband device is a colorimeter. In one embodiment, the narrowband device is a spectrometer. In one embodiment, the test pattern belongs to a set of predetermined test patterns that includes 61 unique digital color stimulus patterns.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1A:
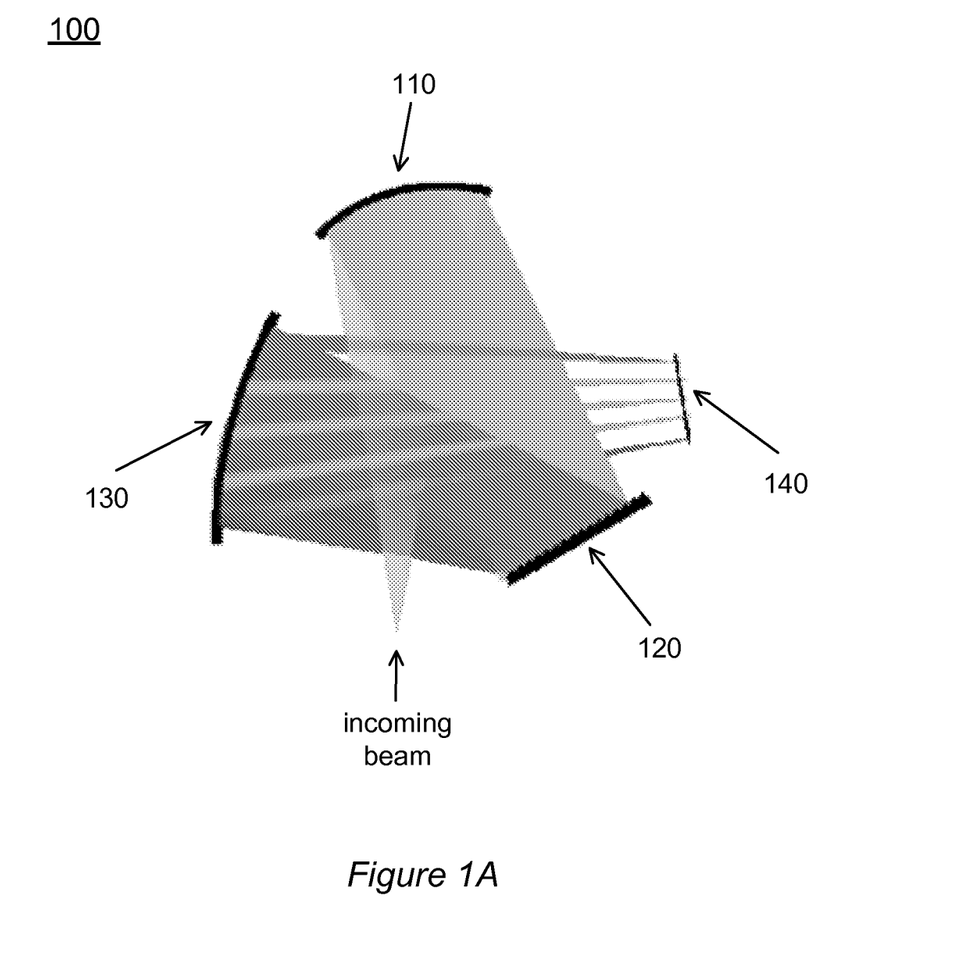
FIGS. 1A-1C illustrate three widely used types of spectrometer configurations: (1A) Crossed Czerny-Turner, (1B) Lens-Grating-Lens, and (1C) Mirror-Grating-Mirror.
Figure 1B:
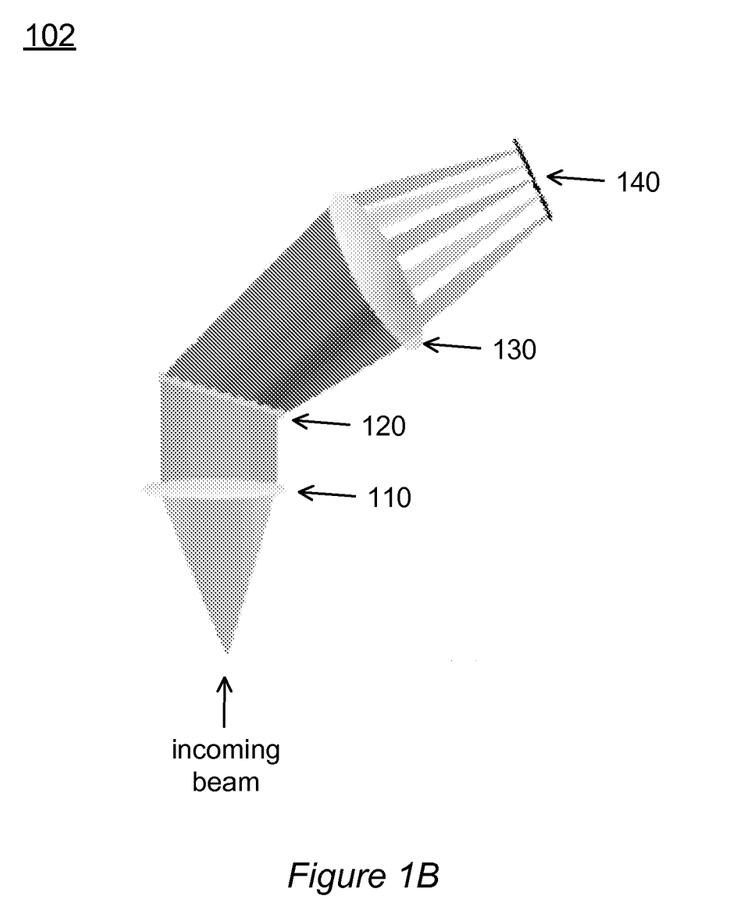
Figure 1C:
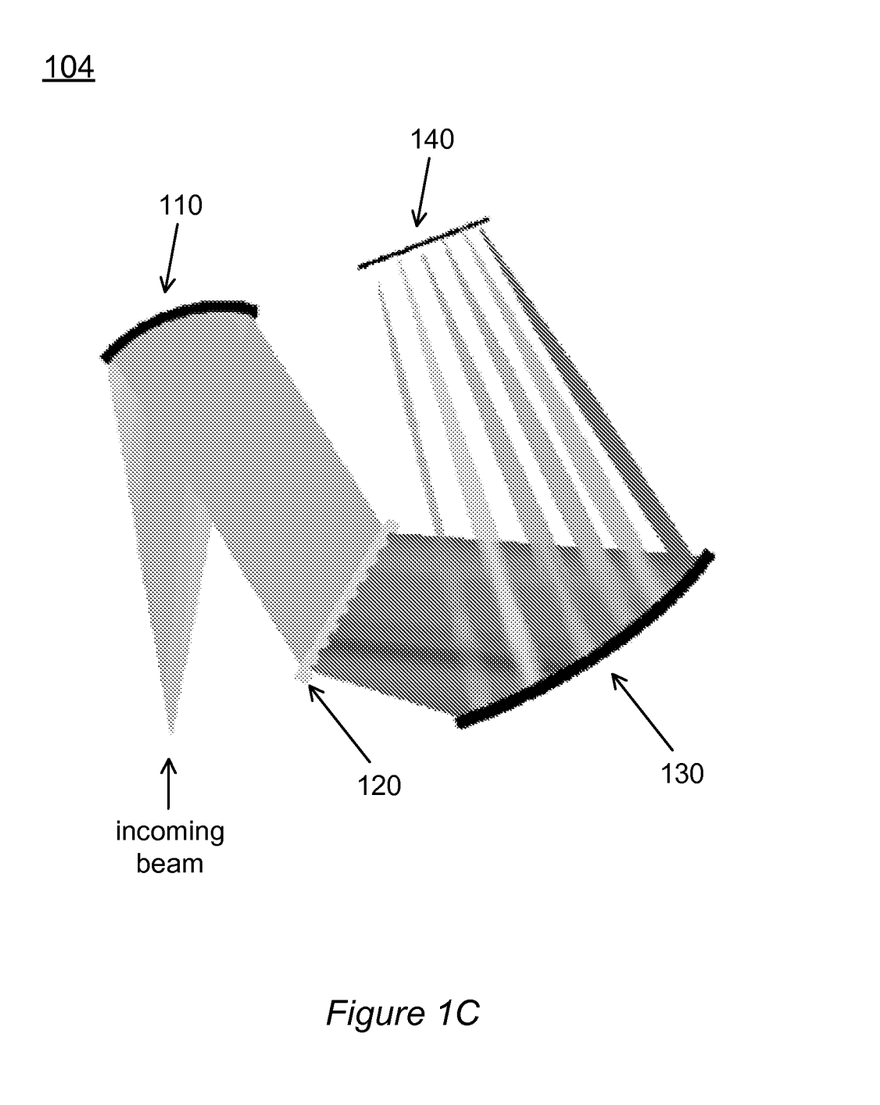

Spectrometer is an example of a narrowband color measurement device which can quantify and measure the spectrum. FIGS. 1A-1C illustrate the three basic types of spectrometer configurations that are widely used and that can be used for parallel testing configuration with a spectra-camera. They are the Crossed Czerny-Turner (FIG. 1A), Lens-Grating-Lens (FIG. 1B), and Mirror-Grating-Mirror (FIG. 1C) configurations.

As FIGS. 1A-1C demonstrate, all spectrometers have these four key elements: (1) collimator 110, (2) diffractive grating 120, (3) focusing element 130, and (4) detector array 140. The beam will be first collimated at a curved mirror or lens. As the name indicates, the function of a collimator 110 is to collimate the beams in a controlled manner. The collimated beam is then diffracted by a grating 120. The diffraction grating 120 causes the collimated beam to diverge in angle space with different wavelength outputs. After the grating 120 diffracts the beam, different wavelength output beams will propagate in different direction. To make sure that these outputs beams hit the right detectors, there is usually a focusing mirror or lens positioned to ensure that all the output beams passing through the focusing mirror or lens will focus on the right detector. The output beams with different wavelength will then be detected and absorbed by a detector array 140.

For transmission grating based spectrometer, the Crossed Czerny-Turner spectrometer uses all curved mirrors to realize the collimation and focusing function. The Lens-Grating-Lens (LGL) spectrometer uses two lenses and a grating, while the Mirror-Grating-Mirror (MGM) spectrometer also uses two curved mirrors and a grating. FIG. 1A shows Crossed Czerny-Turner spectrometer 100, which uses curved mirrors for collimator 110 and focusing element 130. FIG. 1B shows Lens-Grating-Lens (LGL) spectrometer 102, which uses lenses for collimator 110 and focusing element 130, while FIG. 1C shows Mirror-Grating-Mirror (MGM) spectrometer 104, which also uses curved mirrors for collimator 110 and focusing element 130.

Spectrometers can be used for basic display parametric testing. As the name indicates, the display basic parameters usually refer to test items which do not involve the use of imaging algorithms, such as display white luminance, contrast, uniformity, gamma, color gamut, etc. The definition of these test items can be found in these four popular standards:
 (1) VESA FPDM ('Video Electronics Standards Association' Flat Panel Display Measurements' standard),
 (2) ISO 13406-2 (International Organization for Standardization 13406-2: "Ergonomic requirements for work with visual displays based on flat panels—Part 2: Ergonomic requirements for flat panel displays"), (3) TCO '05 (Tjänstemännens Centralorganisation '05), and (4) SPWG 3.5 (Standard Panels Working Group standard 3.5).

These standards are slightly different from each other due to historical reasons and because they target different panel sizes.

Figure 2A:
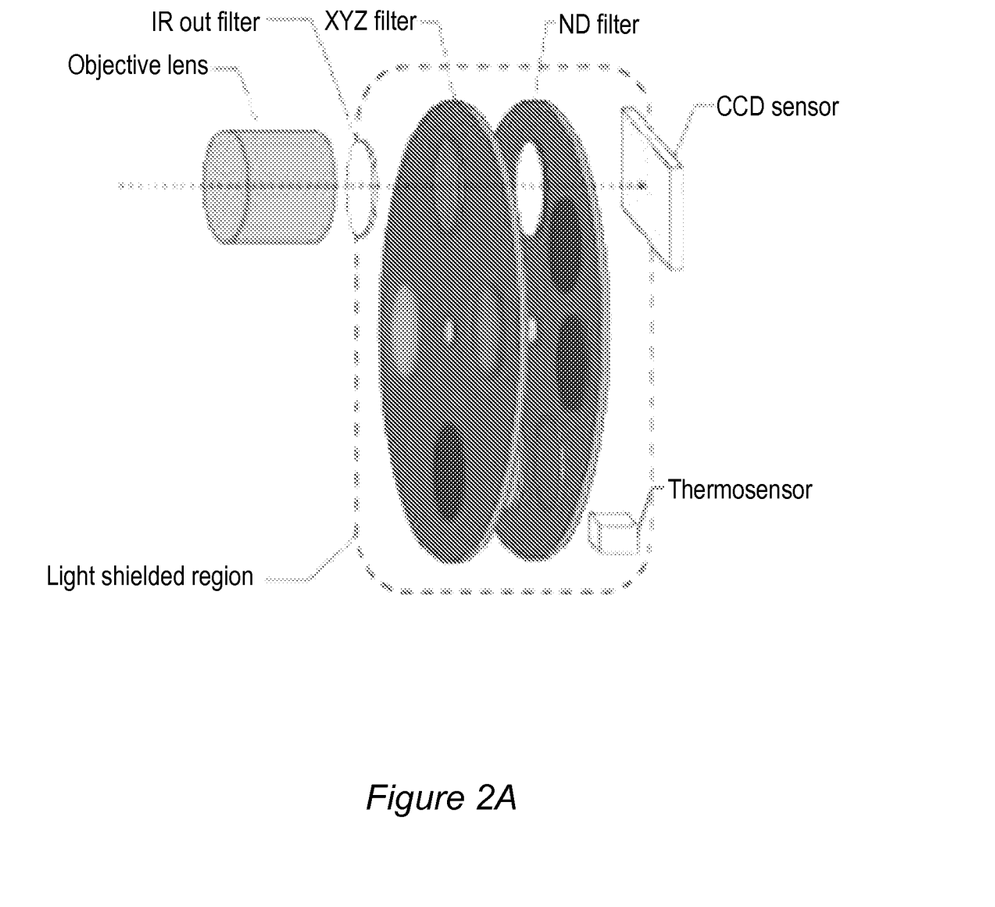
FIGS. 2A-2B illustrate two color separating filter methods for a colorimeter: (2A) time-sequential filter and (2B) Bayer filter.
Figure 2B:
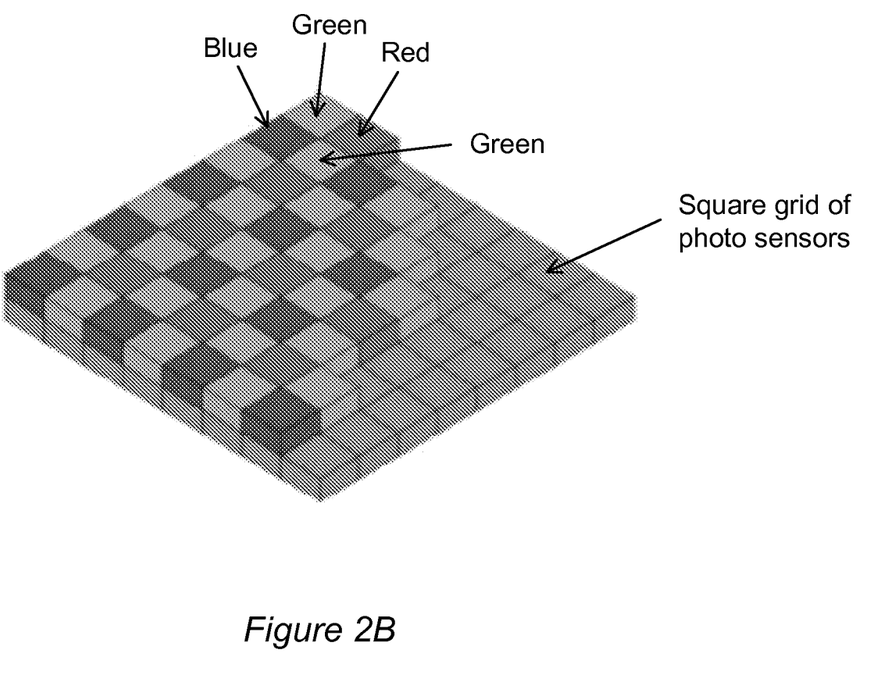

Imaging colorimeter is an example of a wideband color measurement device. Imaging colorimeter, sometimes also called as imaging photometer, is an imaging device which behaves like a camera. The imaging colorimeter can be a time-sequential type or Bayer filter type. The time-sequential type colorimeter separates the measurement objective color in a time sequential manner by using a spinning color wheel, which is shown in FIG. 2A. At any particular moment, the measurement objective photons with only a certain color will be transmitting through the filter and hitting the embedded CCD or CMOS imager inside the colorimeter. The overall display color information and imaging can be reconstructed after at least one cycle of the color wheel spinning A second type of imaging colorimeter separates the color channels by Bayer filters, which are shown in FIG. 2B. A Bayer filter is a color filter array which is composed of periodically aligned 2×2 filter element. The 2×2 filter element is composed of two green filter elements, one red filter and one blue filter element. The Bayer filter sits on top of a square grid of photo sensors.

There are advantages and disadvantages to both types of colorimeters. The time-sequential colorimeter will be more precise, but also more time consuming. The Bayer filter colorimeter, on the other hand, has the one-shot capability to extract the color information with resolution loss. Additionally, there is also a third type of spatial Foveon filter which can separate the color by vertical stack photodiode layer. In the Foveon filter, the red, green, and blue (RGB) color sensitive pixels lie stacked on top of each other, in layers, instead of spread on a single layer as is found in the Bayer filter. Foveon filter can have the advantage that color artifacts normally associated with the Bayer filter are eliminated and light sensitivity is increased, but there are very few applications of the Bayer filter in cameras and none in off-the-shelf colorimeters.

Imaging colorimeter can be used for artifact testing, which is more complicated than basic display parametric testing and without clear boundary. The artifacts refer to the human perception of the display visual artifacts. The detected artifacts can be classified into two categories: (a) Static artifacts, where artifacts do not change over time; and (b) Dynamic artifact, where the artifacts are more visible during a certain time frame. Dynamic artifacts include flickering (i.e., luminance exhibits a frequency pattern which can cause human eye fatigue), ripper, and dynamic cross-talk. For both static and dynamic artifacts, depending on the viewing condition, they can be further classified as on-axis artifacts which are visible at normal view and off-axis artifacts which are visible at tilt angle view.

The use of imaging colorimeters for fast capture of photometric and colorimetric quantities with spatial resolution is very attractive. Compared with measuring instruments without spatial resolutions, such as spectrometers, imaging colorimeters offer the advantage of substantial time savings since a single image can simultaneously capture a large number of measurements. Imaging colorimeters also offer the advantage of being able to perform automated methods of analysis, such as calculation of homogeneity or contrast, because of image processing functions integrated in the imaging software. Additionally, imaging colorimeters are relatively inexpensive as compared to spectrometers.

However, the imaging colorimeters and photometers have a lower measuring precision than spectrometers. This is because imaging colorimeters operate using a CCD (charge-coupled device) sensor in combination with optical filters. For example, in the case of the Bayer filter, there are only three types of color filters (i.e., red, green, and blue), so there is lacking the precision found in spectrometers, where the visible spectrum can be partitioned by increments ranging from 1 to 10 nm, resulting in 30-200 channels. Therefore, in a spectra-camera used for display testing, the imaging colorimeters are best utilized for measurement of luminance and color distribution of panel graphics and control elements, including but not limited to homogeneity, contrast, mura (i.e., luminance non-uniformity of a display device) and MTF (Modulation Transfer Function).

Figure 3:
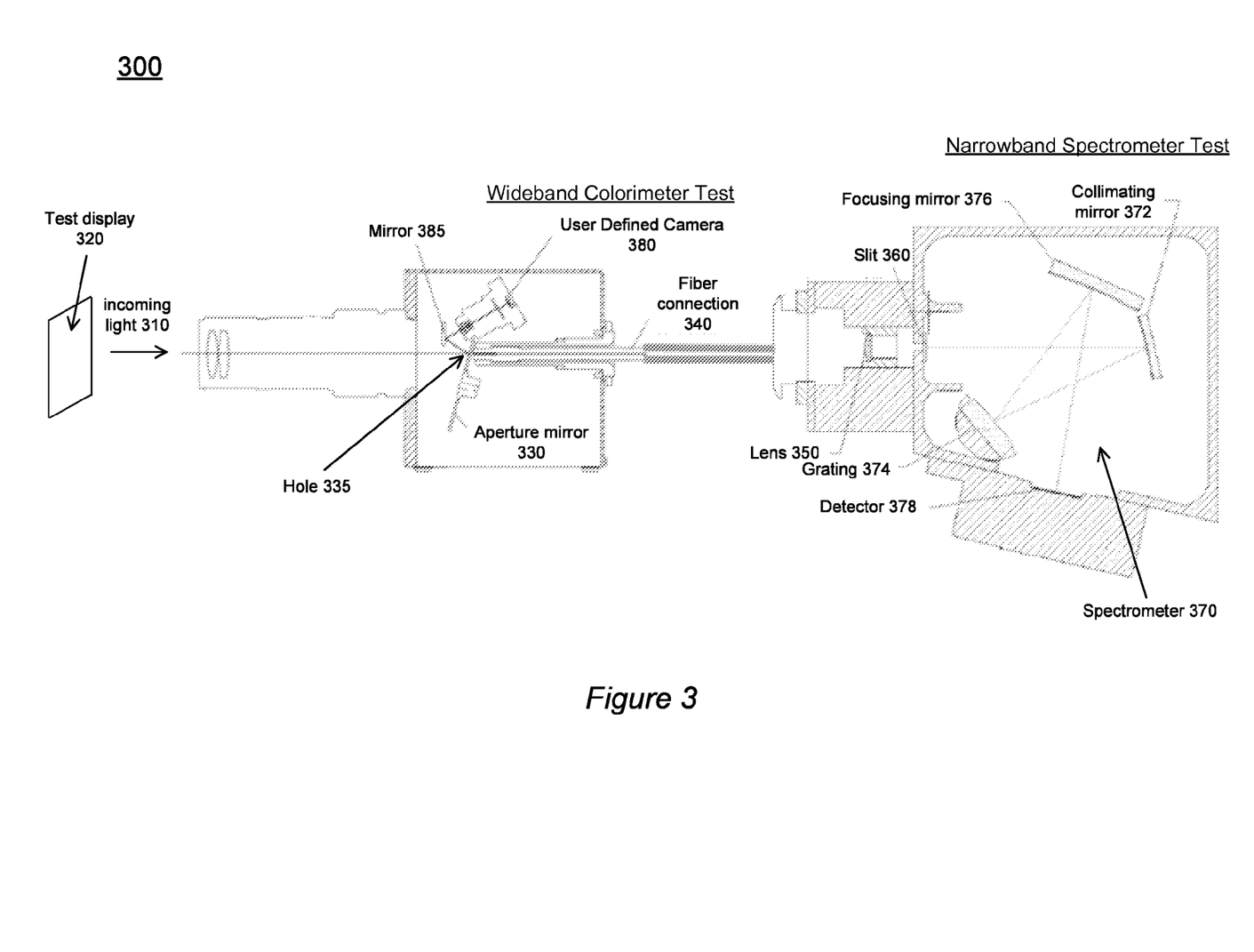
FIG. 3 illustrates an embodiment of a spectra-camera, which can be used for calibration of a wideband colorimeter with a narrowband spectrometer, in accordance with one embodiment described in the specification.

FIG. 3 illustrates a display test equipment (e.g., Spectra-camera), which can simultaneously incorporate the testing objectives of both a wideband and a narrowband device. The narrowband device is a high accuracy device measuring a single spot on a display, so there is little or no spatial resolution. Examples of a narrowband device include a spectrometer together with or without a filter based probe. A narrowband device can perform display parametric testing, which includes testing basic display attributes, such as brightness, contrast, color, gamut, gamma, etc. The narrowband device can have the following features: (1) expensive, (2) variable measurement spot, and (3) limited capability for dynamic artifacts, but only flickering can be detected. The wideband device, on the other hand, is a low accuracy device measuring a large area on a display, so there is high spatial resolution. Examples of a wideband device include a time-sequential type or Bayer filter type imaging colorimeter. A wideband device can perform display artifact testing, which includes testing visual artifacts, light leakage, yellow mura, LED (light-emitting diode) hotspot, backlight damage, etc. The wideband device can have the following features: (1) long image pipeline (complicated), (2) less accurate than the narrowband device, and (3) incapable for dynamic artifacts.

Since both the wideband and narrowband devices have their advantages, what is desired is a display test equipment that can simultaneously incorporate the testing objectives of both the narrowband device and the wideband device. Such a display test equipment can be called a "Spectra-camera". A spectra-camera is a hybrid test system, which can simultaneously perform the testing functions of both the narrowband device and the wideband device. In one embodiment, a spectra-camera can be a hybrid test system consisting of both a narrowband device and a wideband device. By splitting an image of a display to be tested into two parts, a spectra-camera can send the two parts to both devices at the same time for testing. For example, the part sent to the narrowband device can be an image of a spot on the display, while the part sent to the wideband device can be an image of the entire display minus the spot.

FIG. 3 illustrates an embodiment of a spectra-camera 300. Spectra-camera 300 can read the spectrum and form the image. Incoming light 310 from a display 320 to be tested enters a slit and hit an aperture mirror 330. A hole 335 in the aperture mirror 330 can enable some of the light to be sampled into a fiber connector 340. It is not shown, but in another embodiment a beam splitter, instead of an aperture mirror, can enable some of the light to be sampled into a fiber connector 340. The sample light can go through a lens 350 and a slit 360 to avoid stray light. The sample light beam eventually goes through a Crossed Czerny-Turner spectrometer 370 (with collimating mirror 372, grating 374, focusing mirror 376) and the diffracted output is collected by a detector array 378. In the mean time, aperture mirror can also reflect the rest of the light from the test display into a user defined camera 380. It is not shown, but in another embodiment a beam splitter, instead of an aperture mirror, can also reflect the rest of the light from the test display into a user defined camera 380. Camera 380 can form an image to be used for imaging analysis. In the embodiment shown in FIG. 3, mirror 385 can be used to direct the display image into camera 380. In another embodiment that is not shown, the display image can be sent directly into camera 380 without the use of mirror 385, if camera 380 is positioned differently to receive the display image. Spectra-camera 300 has the advantage of a wide test coverage, since both display parametric testing and display artifact testing can be performed at the same time. Doing both tests at the same time reduces test time and boost display testing throughput.

In one embodiment, spectrometer 370 can be configured to perform display parametric testing. In one embodiment, spectrometer 370 can be a Crossed Czerny-Turner spectrometer. In another embodiment, spectrometer 370 can be a Lens-Grating-Lens (LGL) spectrometer or a Mirror-Grating-Mirror (MGM) spectrometer. In one embodiment, spectrometer 370 can be configured to be detachable from spectra-camera 300.

In one embodiment, user defined camera 380 can be configured to perform display artifact testing. In one embodiment, user defined camera 380 can be an imaging colorimeter. In an embodiment, the imaging colorimeter can be a time-sequential type or Bayer filter type. In another embodiment, the imaging colorimeter can be spatial Foveon filter type. In one embodiment, user defined camera 380 can be configured to be detachable from spectra-camera 300.

In one embodiment, a spectra-camera can perform parallel testing, where display artifact testing can occur with the spectrometer on. The display artifact testing can detect various defective display symptoms, such as LED hotspot, dot defect, yellow mura, and line defect. Concurrently, the spectrometer can be used to perform display parametric testing, so that basic attributes, such as brightness, contrast, color gamut, gamma, etc., are measured.

Figure 4:
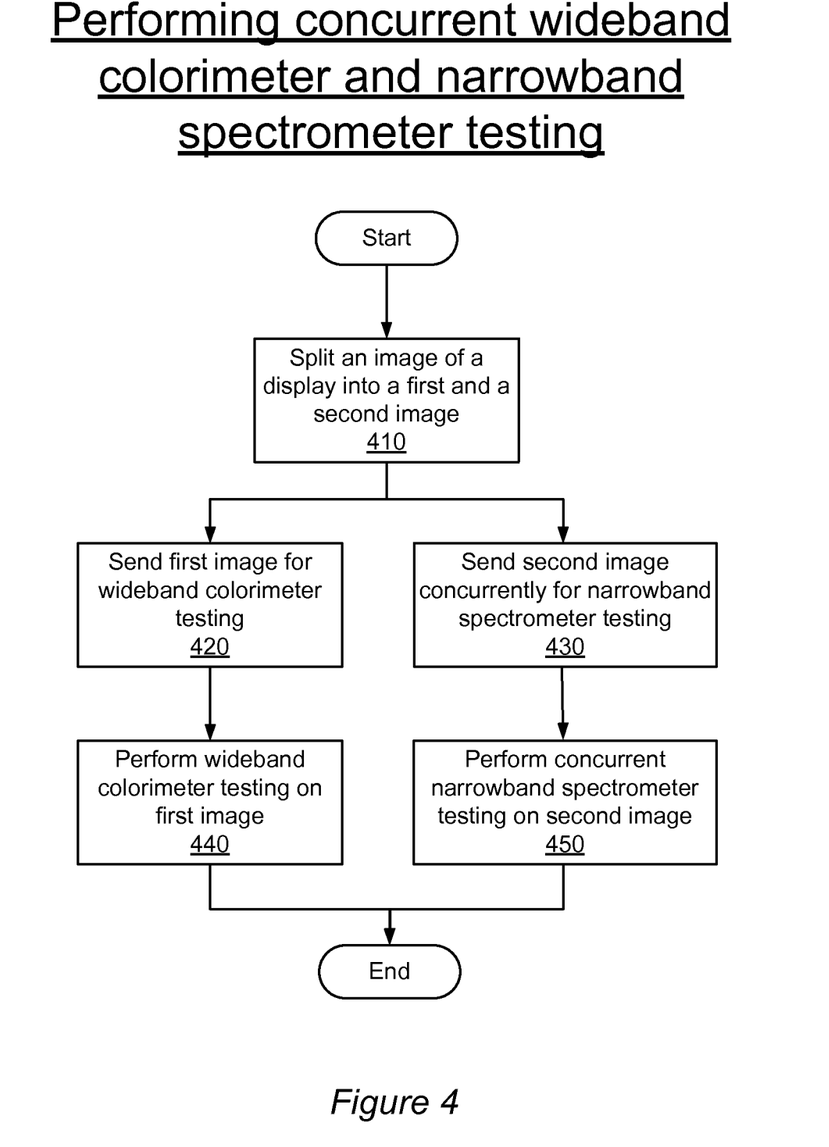
FIG. 4 illustrates a flow chart showing method steps for performing concurrent wideband colorimeter and narrowband spectrometer testing in a spectra-camera, in accordance with one embodiment described in the specification.

FIG. 4 illustrates a flow chart showing method steps for performing concurrent wideband colorimeter and narrowband spectrometer testing. In one embodiment, a method for performing concurrent wideband colorimeter and narrowband spectrometer testing starts with step 410, which splits an image of a display to be tested into a first image and a second image. The method continues in step 420 by sending the first image for wideband colorimeter testing. The method sends, concurrently with the first image, the second image for narrowband spectrometer testing in step 430. Then the method performs wideband colorimeter testing on the first image (step 440) concurrently with the narrowband spectrometer testing on the second image (step 450). Concurrent testing can allow for calibration of the wideband colorimeter using the narrowband spectrometer, which is more accurate for color testing.

In one embodiment, a spectra-camera can perform self-calibration, where the high precision spectrometer can be used to calibrate the low precision imaging colorimeter. This can be accomplished by linking the high precision spectrometer to the low precision imaging colorimeter and performing the equipment self calibration triggered by the same standard illuminant. In one embodiment, the same standard illuminant is used to simultaneously calibrate the high precision spectrometer and the low precision imaging colorimeter in parallel. For the high precision spectrometer, the calibration process flow can include the following process steps:

(1) Luminance Reference Normalization,
(2) Spectral Radiance Normalization,
(3) Photodiode Position Check,
(4) Spectrum, and
(5) Tristimulus values XYZ.

For the low precision imaging colorimeter, the parallel calibration process flow can include the following process steps:

(1) ADC (analog-to-digital converter),
(2) Bad Pixel Correction,
(3) Gain/Offset Correction,
(4) Flat Field Correction,
(5) Luminance Correction,
(6) Linearity Correction,
(7) Focus Correction,
(8) Chromaticity Correction,
(9) Spatial Correction,
(10) Instrument Correlation Correction, and
(11) Tristimulus values XYZ.

The tristimulus values XYZ of the low precision imaging colorimeter is compared against the tristimulus values XYZ of the high precision spectrometer. If they are within a tolerance specification such as 0.0015 for XYZ, then the tolerance specification is met and the low precision imaging colorimeter is deemed to be calibrated. If the tolerance specification is not met, then the low precision imaging colorimeter needs to recalibrated by repeating the colorimeter calibration process from the Luminance Correction process step (i.e., step (5)). At the end of the colorimeter recalibration process, the tristimulus values XYZ of the colorimeter is again compared against the tristimulus values XYZ of the spectrometer. Calibration of the colorimeter is complete if the tolerance specification is met.

In one embodiment, a mathematical model can be used to characterize a wideband three channel colorimeter with a narrowband multiple channel spectrometer.

In the device characterization field, a critical component is multidimensional data fitting and interpolation. Generally, the data samples generated by the characterization process in both device-dependent and device-independent spaces will constitute only a small subset of all possible digital values that could be encountered in either space. One reason for this is that the total number of possible samples in a color space is usually prohibitively large for direct measurement of the characterization function. As an example, R, G, B signals can be represented with 8 bit precision. Thus the total number of possible colors is $2^{24}$=16,777,216. Clearly this is an unreasonable amount of data to be acquired manually. However, since the final characterization function will be used for transforming arbitrary image data, the characterization should be defined for all possible inputs within some expected domain. To accomplish this, some form of data fitting or interpolation can be performed on the characterization samples. In model based characterization, the underlying physical model serves to perform the fitting or interpolation for the forward characterization function.

In one embodiment, the 4-color correction matrix concept can be extended to 61 test points. In one embodiment, this can be a set of predetermined test patterns that includes 61 unique digital color stimulus patterns. Then another 14 random colors will be used to verify that the wideband colorimeter data closely matches the narrowband spectrometer data. The X, Y and Z values are converted to x and y before the error calculation. Table 1 shows an example of 61 unique digital color stimulus patterns that can be used as a set of predetermined test patterns.

TABLE 1

Patterns that can be used for calibration

| | Digital Count R | Digital Count G | Digital Count B |
|---|---|---|---|
| Pattern 1 | 0 | 0 | 0 |
| Pattern 2 | 17 | 0 | 0 |
| Pattern 3 | 34 | 0 | 0 |
| Pattern 4 | 51 | 0 | 0 |
| Pattern 5 | 68 | 0 | 0 |
| Pattern 6 | 85 | 0 | 0 |
| Pattern 7 | 102 | 0 | 0 |
| Pattern 8 | 119 | 0 | 0 |
| Pattern 9 | 136 | 0 | 0 |
| Pattern 10 | 153 | 0 | 0 |
| Pattern 11 | 170 | 0 | 0 |
| Pattern 12 | 187 | 0 | 0 |
| Pattern 13 | 204 | 0 | 0 |
| Pattern 14 | 221 | 0 | 0 |
| Pattern 15 | 238 | 0 | 0 |
| Pattern 16 | 255 | 0 | 0 |
| Pattern 17 | 0 | 17 | 0 |
| Pattern 18 | 0 | 34 | 0 |
| Pattern 19 | 0 | 51 | 0 |
| Pattern 20 | 0 | 68 | 0 |
| Pattern 21 | 0 | 85 | 0 |
| Pattern 23 | 0 | 102 | 0 |
| Pattern 23 | 0 | 119 | 0 |
| Pattern 24 | 0 | 136 | 0 |
| Pattern 25 | 0 | 153 | 0 |
| Pattern 26 | 0 | 170 | 0 |
| Pattern 27 | 0 | 187 | 0 |
| Pattern 28 | 0 | 204 | 0 |
| Pattern 29 | 0 | 221 | 0 |
| Pattern 30 | 0 | 238 | 0 |
| Pattern 31 | 0 | 255 | 0 |
| Pattern 32 | 0 | 0 | 17 |
| Pattern 33 | 0 | 0 | 34 |
| Pattern 34 | 0 | 0 | 51 |
| Pattern 35 | 0 | 0 | 68 |

TABLE 1-continued

Patterns that can be used for calibration

| | Digital Count R | Digital Count G | Digital Count B |
|---|---|---|---|
| Pattern 36 | 0 | 0 | 85 |
| Pattern 37 | 0 | 0 | 102 |
| Pattern 38 | 0 | 0 | 119 |
| Pattern 39 | 0 | 0 | 136 |
| Pattern 40 | 0 | 0 | 153 |
| Pattern 41 | 0 | 0 | 170 |
| Pattern 42 | 0 | 0 | 187 |
| Pattern 43 | 0 | 0 | 204 |
| Pattern 44 | 0 | 0 | 221 |
| Pattern 45 | 0 | 0 | 238 |
| Pattern 46 | 0 | 0 | 255 |
| Pattern 47 | 17 | 17 | 17 |
| Pattern 48 | 34 | 34 | 34 |
| Pattern 49 | 51 | 51 | 51 |
| Pattern 50 | 68 | 68 | 68 |
| Pattern 51 | 85 | 85 | 85 |
| Pattern 52 | 102 | 102 | 102 |
| Pattern 53 | 119 | 119 | 119 |
| Pattern 54 | 136 | 136 | 136 |
| Pattern 55 | 153 | 153 | 153 |
| Pattern 56 | 170 | 170 | 170 |
| Pattern 57 | 187 | 187 | 187 |
| Pattern 58 | 204 | 204 | 204 |
| Pattern 59 | 221 | 221 | 221 |
| Pattern 60 | 238 | 238 | 238 |
| Pattern 61 | 255 | 255 | 255 |

As an example, after the measurement using the narrowband spectrometer and the wideband colorimeter, the color correction matrix can be obtained in the below format:

| | | |
|---|---|---|
| aX[1] = −0.014609 | aY[1] = −0.017631 | aZ[1] = 0.024884 |
| aX[2] = 0.931186 | aY[2] = 0.068468 | aZ[2] = −0.003951 |
| aX[3] = −0.045284 | aY[3] = 0.817216 | aZ[3] = 0.004081 |
| aX[3] = −0.004684 | aY[4] = −0.011521 | aZ[4] = 0.850434 |

TABLE 2 lists the raw data during the measurement, before and after using the correction matrix

| COLOR | ORIGINAL ERROR x | ORIGINAL ERROR y | CORRECTED ERROR x | CORRECTED ERROR y |
|---|---|---|---|---|
| White | 0.005803118 | 0.003390245 | 0.001357612 | 0.001791935 |
| Fuchsia | 0.010929051 | 0.010255611 | 0.002357682 | 0.001699973 |
| Red | −0.010552573 | 0.014348118 | 0.00096754 | −0.000131641 |
| Silver | 0.004753463 | 0.002249964 | 0.000338233 | 0.000696155 |
| Gray | 0.004292981 | 0.000438794 | 1.94125E−05 | −0.000893157 |
| Olive | 0.000992562 | −0.00065155 | −0.000431134 | −0.000251556 |
| Purple | 0.008693544 | 0.008715242 | 0.000495887 | 0.000663561 |
| Maroon | −0.008015031 | 0.011809138 | −0.000679522 | 0.001593174 |
| Aqua | −0.000848702 | −0.00094957 | −0.000900931 | 0.00064071 |
| Lime | −0.005728015 | 0.000750034 | −0.001553989 | −0.000941518 |
| Teal | −0.000344654 | −0.00347737 | −0.000159383 | −0.001441836 |
| Green | −0.004834236 | 0.001791446 | −0.000329158 | 0.001183251 |
| Blue | 0.00401903 | −0.003069638 | −0.000796601 | −0.000594766 |
| Navy | 0.005024664 | −0.002098077 | 0.000747138 | 0.000974822 |

Figure 5:
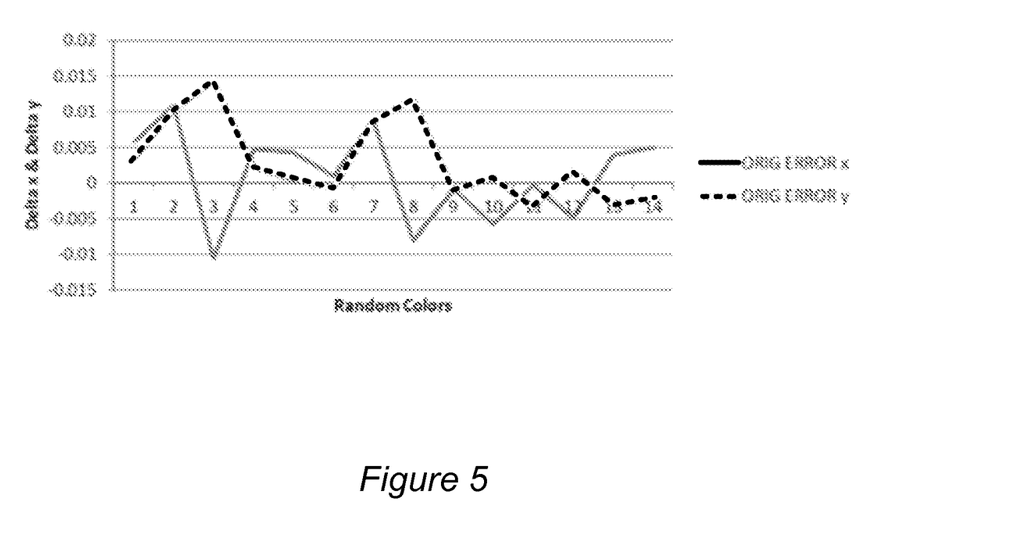
FIG. 5 shows error ranges for 14 patterns before correction is applied.
Figure 6:
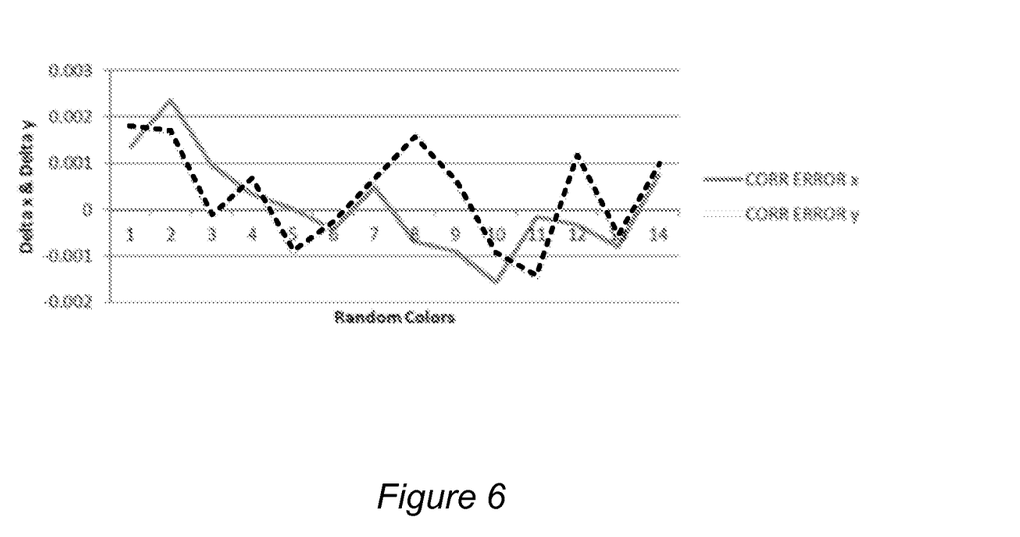
FIG. 6 shows error ranges for 14 patterns after correction is applied.

Table 2 shows the errors in x and y for 14 color patterns as determined for the case before the correction matrix was used (i.e., original error) and for the case after the correction matrix was used (i.e., corrected error). It can be seen that, after using the correction, the wideband colorimeter accuracy can be improved by one order of magnitude. The data in Table 2 is plotted in FIGS. 5 and 6, and summarized in Table 3 (summary table). FIG. 5 shows a plot of the original errors in x and y (i.e., before using the correction matrix) for 14 color patterns, while FIG. 6 shows a plot of the corrected errors in x and y (i.e., after using the correction matrix) for the same 14 color patterns. Table 3 below summarizes the averages and standard deviations of the errors both for before using correction matrix (i.e., original) and for after using the correction matrix (i.e., corrected).

TABLE 3

Summary table of the errors in x and y

| | x AVERAGE | y AVERAGE | x STD DEV | y STD DEV |
|---|---|---|---|---|
| Before Correction | 0.001013229 | 0.003107314 | 0.006387198 | 0.005811428 |
| After Correction | 0.000102342 | 0.000356365 | 0.001028542 | 0.001064983 |

From the above existing data, it can be seen that the proper pattern choices can help improve the accuracy and precision level of the wideband colorimeter by up to a factor of 5-10 times.

Figure 7:
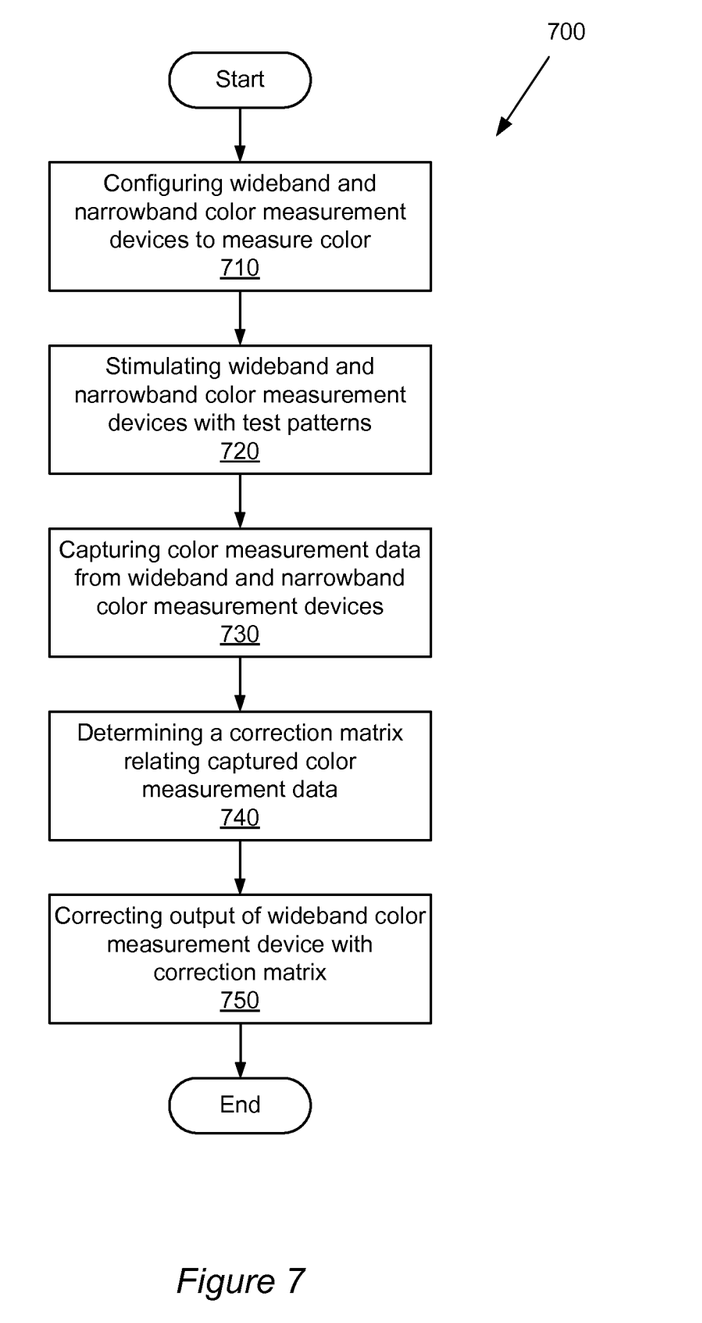
FIG. 7 illustrates a flow chart of method steps for correcting the output of a wideband colorimeter, in accordance with one embodiment described in the specification.

FIG. 7 is a flow chart of a method 700, including steps for correcting the output of a wideband colorimeter, in accordance with one embodiment described in the specification. As shown in FIG. 7, the method 700 begins at step 710, where the method configures a wideband color measurement device and a narrowband color measurement device to measure color. Then, at step 720, the method stimulates both the wideband color measurement device and the narrowband color measurement device with predetermined test patterns. In one embodiment, the test patterns can be as described in Table 1 above. In another embodiment, the test patterns include 61 unique digital color stimulus patterns. In other embodiments, more than 61 test patterns can be used. Next, at step 730, the method captures color measurement data from the wideband color measurement device and the narrowband color measurement device. After step 730, the method proceeds to step 740, where the method determines a correction matrix relating the captured data. In one embodiment, the wideband and the narrowband color measurement device outputs can be related by the correction matrix. Then the method proceeds to step 750, where the method corrects the color measurement output of the wideband color measurement device with the correction matrix.

Figure 8:
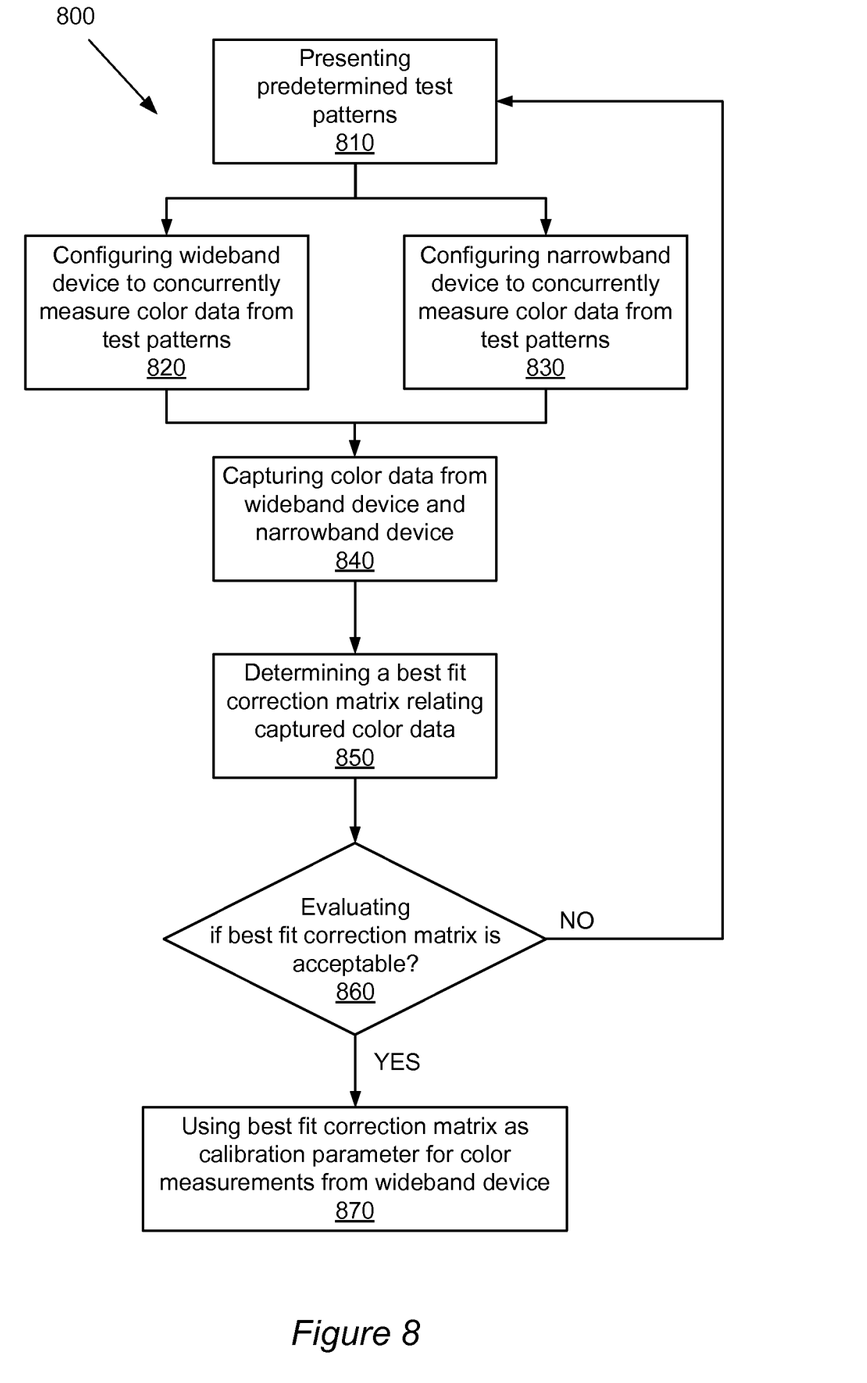
FIG. 8 illustrates a flow chart showing method steps for performing calibration of a wideband color measurement device with a narrowband color measurement device, so that more accurate outputs of the wideband color measurement device can be provided, in accordance with one embodiment described in the specification.

FIG. 8 illustrates a flow chart showing method steps for performing calibration of a wideband color measurement device with a narrowband color measurement device, so that more accurate outputs of the wideband device can be provided, in accordance with one embodiment described in the specification. In one embodiment, the method shown in FIG. 8 can be performed using a device, such as a spectra camera illustrated in FIG. 3. As shown in FIG. 8, the method 800 begins at step 810, where the method presents predetermined test patterns. Then, at steps 820 and 830, the method configures the narrowband color measurement device and the wideband color measurement device to concurrently measure color data from the predetermined test patterns. In one embodiment, the test patterns can be as described in Table 1 above. In another embodiment, the test patterns include 61 unique digital color stimulus patterns. In other embodiments, more than 61 test patterns can be used. Next, at step 840, the method captures the color data from the wideband color measurement device and the narrowband color measurement device. After step 840, the method proceeds to step 850, where the method determines a best fit correction matrix relating the captured color data. In one embodiment, the best fit correction matrix can be a 3×3 matrix. In another embodiment, the best fit correction matrix can be a 3×4 matrix. In the 3×4 matrix, the last column corresponds to a constant offset, because for very low brightness, the effect will be more important to make it more accurate. Then the method proceeds to step 860, where there is an evaluation if the best fit correction matrix is acceptable as a calibration parameter for color measurements from the wideband device. If the best fit correction matrix is acceptable as a calibration parameter, then the method proceeds to step 870, where the method uses the best fit correction matrix as the calibration parameter for the color measurements from the wideband device. If the best fit correction matrix is not acceptable, then the method returns to step 810, where the method repeats the calibration process again, starting with presentation of predetermined test patterns.

Figure 9:
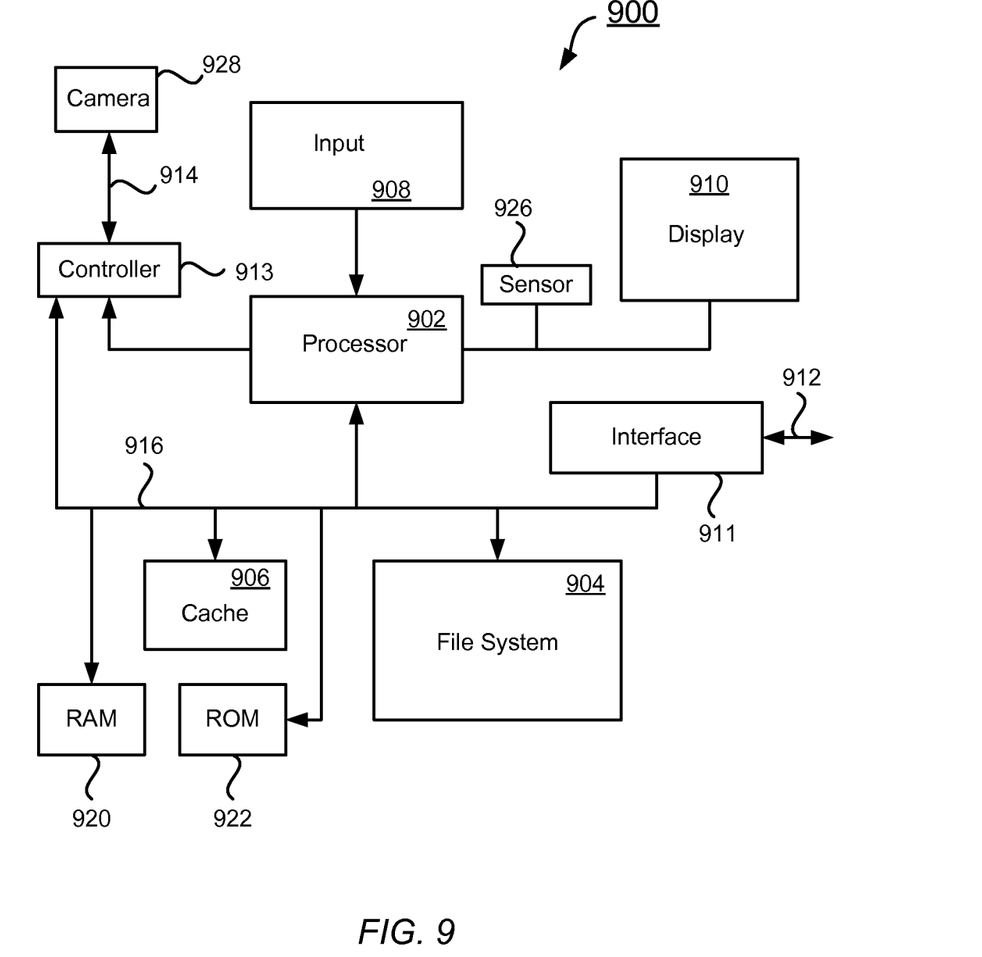
FIG. 9 is a block diagram of an electronic device suitable for implementing some of the described embodiments.

FIG. 9 is a block diagram of an electronic device suitable for controlling some of the processes in the described embodiments. Electronic device 900 can illustrate circuitry of a representative computing device. Electronic device 900 can include a processor 902 that pertains to a microprocessor or controller for controlling the overall operation of electronic device 900. Electronic device 900 can include instruction data pertaining to operating instructions, such as instructions for implementing and controlling a user equipment, in a file system 904 and a cache 906. File system 904 can be a storage disk or a plurality of disks. In some embodiments, file system 904 can be flash memory, semiconductor (solid state) memory or the like. The file system 904 can typically provide high capacity storage capability for the electronic device 900. However, since the access time for the file system 904 can be relatively slow (especially if file system 904 includes a mechanical disk drive), the electronic device 900 can also include cache 906. The cache 906 can include, for example, Random-Access Memory (RAM) provided by semiconductor memory. The relative access time to the cache 906 can be substantially shorter than for the file system 904. However, cache 906 may not have the large storage capacity of file system 904. The electronic device 900 can also include a RAM 920 and a Read-Only Memory (ROM) 922. The ROM 922 can store programs, utilities or processes to be executed in a non-volatile manner. The RAM 920 can provide volatile data storage, such as for cache 906.

Electronic device 900 can also include user input device 908 that allows a user of the electronic device 900 to interact with the electronic device 900. For example, user input device 908 can take a variety of forms, such as a button, keypad, dial, touch screen, audio input interface, visual/image capture input interface, input in the form of sensor data, etc. Still further, electronic device 900 can include a display 910 (screen display) that can be controlled by processor 902 to display information, such as test results, to the user. Data bus 916 can facilitate data transfer between at least file system 904, cache 906, processor 902, and input/output (I/O) controller 913. I/O controller 913 can be used to interface with and control different devices such as camera, spectrometer or motors to position mirror/lens through appropriate codecs. For example, control bus 914 can be used to control camera 928.

Electronic device 900 can also include a network/bus interface 911 that couples to data link 912. Data link 912 can allow electronic device 900 to couple to a host computer or to accessory devices or to other networks such as the internet. The data link 912 can be provided over a wired connection or a wireless connection. In the case of a wireless connection, network/bus interface 911 can include a wireless transceiver. Sensor 926 can take the form of circuitry for detecting any number of stimuli. For example, sensor 926 can include any number of sensors for monitoring a environmental conditions such as for example a light sensor such as a photometer, a temperature sensor and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium executable by a processor. The computer readable medium is any data storage device that can store data which can thereafter be read by a computer system. Examples of the computer readable medium include read-only memory, random-access memory, CD-ROMs, HDDs, SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A system configured to use a narrowband color measurement device to calibrate an output of a wideband color measurement device, the system comprising:
    a splitter configured to split an image of a test pattern into a first image and a second image;
    a first image pipeline to direct the first image to a narrowband device configured to capture a first data from the first image;
    a second image pipeline to direct the second image to a wideband device configured to capture a second data from the second image, wherein the captured first data and the captured second data are used to determine a best fit correction matrix relating color data of the captured first data and the captured second data, and the best fit correction matrix is evaluated for being acceptable as a calibration parameter for a color measurement of the wideband device.

2. The system of claim 1, wherein the best fit correction matrix is used for calibration of the wideband device.

3. The system of claim 2, wherein the wideband device is a colorimeter.

4. The system of claim 3, wherein the colorimeter includes a Bayer filter.

5. The system of claim 3, wherein the colorimeter includes a color wheel.

6. The system of claim 2, wherein the narrowband device is a spectrometer.

7. A method for using a narrowband color measurement device to calibrate an output of a wideband color measurement device, the method comprising:
    splitting an image of a test pattern into a first image and a second image;
    directing the first image to a narrowband device using a first image pipeline;
    capturing a first data from the first image using the narrowband device;
    directing the second image to a wideband device using a second image pipeline;
    capturing a second data from the second image using the wideband device;
    determining, using the captured first data and the captured second data, a best fit correction matrix relating color data of the captured first data and the captured second data; and
    evaluating the best fit correction matrix for being acceptable as a calibration parameter for a color measurement of the wideband device.

8. The method of claim 7, wherein the test pattern belongs to a set of predetermined test patterns comprising 61 unique digital color stimulus patterns.

9. The method of claim 7, wherein the wideband device is a colorimeter.

10. The method of claim 9, wherein the colorimeter includes a Bayer filter.

11. The method of claim 9, wherein the colorimeter includes a color wheel.

12. The method of claim 7, wherein the narrowband device is a spectrometer.

13. The method of claim 7, wherein the best fit correction matrix is a 3×3 matrix.

14. The method of claim 7, wherein the best fit correction matrix is a 3×4 matrix.

15. A non-transitory computer-readable medium storing instructions that when executed by a processor of a computing device cause the computing device to perform the steps of:
    capturing a first data corresponding to a first image from a narrowband device;
    capturing a second data corresponding to a second image from a wideband device, wherein the first image and the second image are derived from splitting an image of a test pattern;
    determining, based on the captured first data and the captured second data, a best fit correction matrix relating color data of the captured first data and the captured second data; and
    evaluating the best fit correction matrix for being acceptable as a calibration parameter for a color measurement of the wideband device.

16. The non-transitory computer-readable medium as recited in claim 15, further comprising the steps of:
    modifying an output of the wideband device using the best fit correction matrix.

17. The non-transitory computer-readable medium as recited in claim 15, wherein the best fit correction matrix is a 3×3 matrix.

18. The non-transitory computer-readable medium as recited in claim 15, wherein the best fit correction matrix is a 3×4 matrix.

19. The non-transitory computer-readable medium as recited in claim 15, further comprising the steps of:
    when the best fit correction matrix is determined to be unacceptable as the calibration parameter for the color measurement of the wideband device, capturing a new first image and a new second image.

20. The non-transitory computer-readable medium as recited in claim 15, wherein the wideband device is a colorimeter and the narrowband device is a spectrometer.

* * * * *